United States Patent [19]

Dovey

[11] Patent Number: 4,526,308
[45] Date of Patent: Jul. 2, 1985

[54] CAMERA SUPPORT

[76] Inventor: Dennis J. Dovey, 10522 Huntington Wood, Houston, Tex. 77099

[21] Appl. No.: 569,300

[22] Filed: Jan. 9, 1984

[51] Int. Cl.³ .................. G03B 17/00; A45F 5/00
[52] U.S. Cl. ............................. 224/265; 224/185; 224/908
[58] Field of Search ........... 224/265, 266, 270, 908, 224/909, 185; 294/139

[56] References Cited

U.S. PATENT DOCUMENTS

| | | | |
|---|---|---|---|
| 2,603,134 | 7/1952 | Burnam | 224/270 X |
| 2,636,822 | 4/1953 | Anderson | 224/908 X |
| 2,861,854 | 11/1958 | Best | 224/270 X |
| 3,009,613 | 11/1961 | Noland | 224/270 X |
| 3,332,593 | 7/1967 | Fauser | 224/908 X |
| 3,541,976 | 11/1970 | Rozas | 224/270 X |
| 3,661,308 | 5/1972 | Walters | 224/270 X |
| 4,091,975 | 5/1978 | Russell, Jr. | 224/908 X |
| 4,244,500 | 11/1981 | Fournier | 224/908 X |

Primary Examiner—Stephen Marcus
Assistant Examiner—Robert Petrik
Attorney, Agent, or Firm—Cullen, Sloman, Cantor, Grauer, Scott and Rutherford

[57] ABSTRACT

A camera support which may be hooked over the shoulders of the wearer is self-standing if placed on a planar member. The camera support includes a first U-shaped tubular member having a base and a pair of opposed spaced apart legs and tubular extension members extending outwardly from the ends of each of the legs of the U-shaped member. The tubular extension members are both longitudinally and rotatably connected to the U-shaped base and each of the tubular extension members includes a plurality of tubes connected for relative pivotal rotation. The camera is mounted to the support by a dual clamp mounting system permitting 360° rotation about a plurality of axes with the axes at right angles to each other.

5 Claims, 5 Drawing Figures

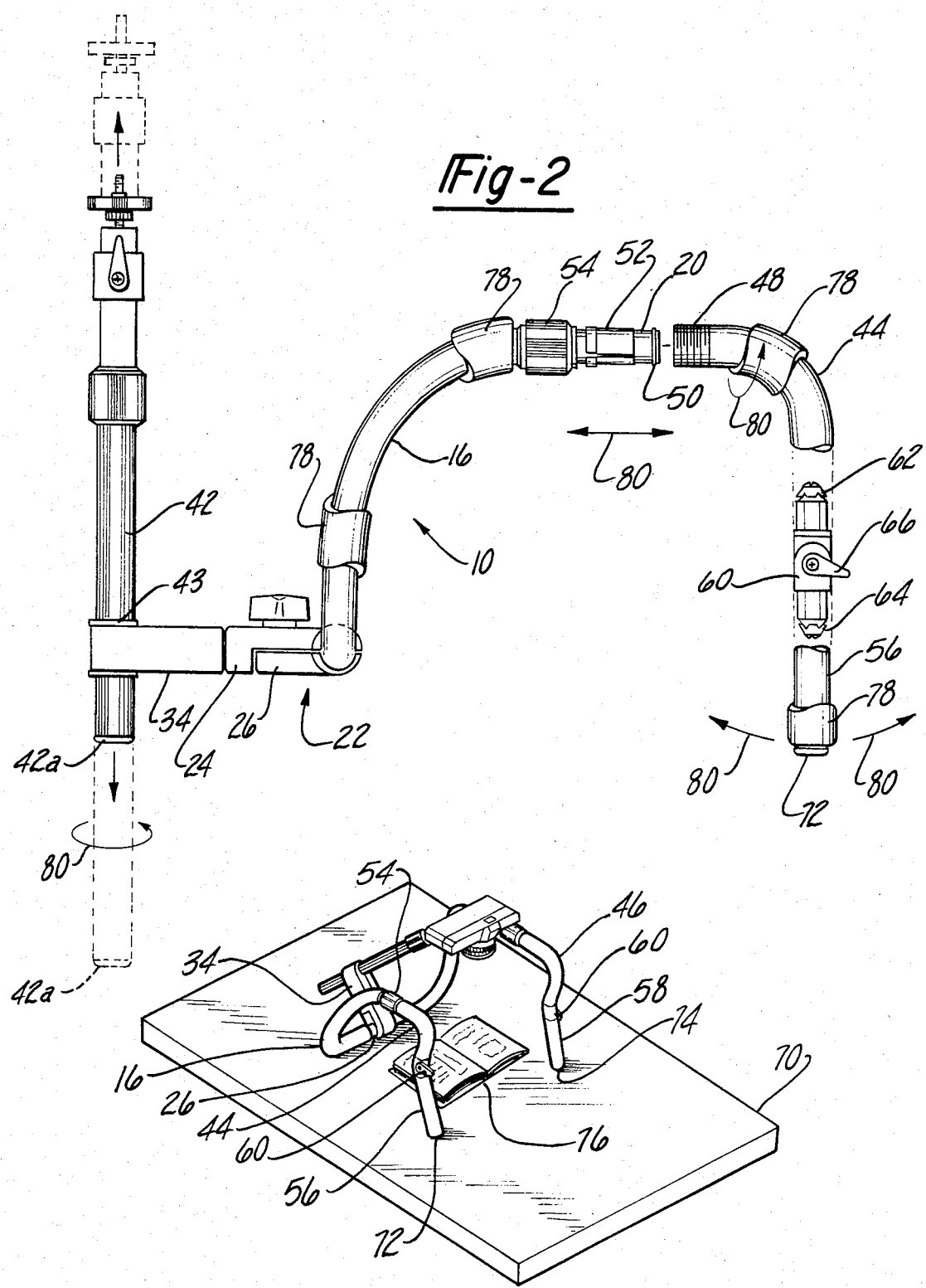

CAMERA SUPPORT

BACKGROUND OF THE INVENTION

This invention relates generally to a camera support and, more particularly, to an improved camera support having a substantial degree of flexibility and utility.

Camera supports are, of course, well known. For example, U.S. Pat. No. 2,636,822 of K. B. Anderson issued April 28, 1953 relates to a device for supporting a camera or similar instrument which support is hooked over the shoulders of the wearer and the camera is mounted on the support. The support is made of tubular halves, each half hooking over one shoulder of the wearer, with the two halves interconnected by a stud.

U.S. Pat. No. 3,332,593 issued to E. E. Fauser on July 25, 1967 describes a camera support including cushioned pads on tubular metal members which tubular metal members are positioned behind and in front of the wearer. The support provides for some adjustability.

U.S. Pat. No. 3,882,524 of May 6, 1975 to Rauscher illustrates a camera support or the like wherein a single hook may be placed over either shoulder of the wearer for supporting the camera in front of the wearer.

U.S. Pat. No. 3,934,769 to Carlson, Jr. issued Jan. 27, 1976, relates to a shoulder carrier for a video tape machine and camera wherein two shoulder members are provided with each shoulder member to be hooked over one shoulder of the wearer.

SUMMARY OF THE INVENTION

The present invention is directed to new and improved camera support having numerous features, benefits and advantages. The camera support of the present invention is adjustable in size from front to back, from side-to-side and in an angular manner to accommodate wearers of different size and shape and still provide a snug fit. This makes the support more confortable when worn for long periods of time.

In addition, the support of the present invention is self-standing. That is, the support adapted to be placed on a planar surface for suporting a camera or the like such that time exposure photographs may be taken and, in addition, so that close-up photographs may be taken.

BRIEF DESCRIPTION OF THE DRAWINGS

The foregoing advantages of the present invention, together with other objects and advantages which may be attained by its use, will become more apparent upon reading the following detailed description of the invention taken in conjunction with the drawings.

In the drawings, wherein like reference numerals identify corresponding component parts of the camera support of the present invention:

FIG. 2 is a partially exploded side elevational view of the support of the present invention;

FIG. 5 is an illustration of the camera support of the present invention on a planar surface so that close-up photographs may be taken.

DETAILED DESCRIPTION OF THE INVENTION

Figure 1:
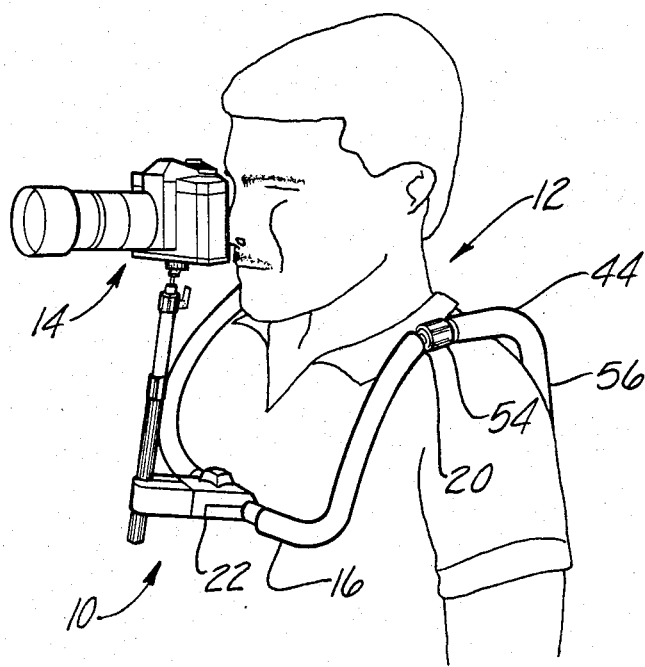
FIG. 1 is an illustration of the support of the present invention positioned on a person and supporting a camera.
Figure 3:
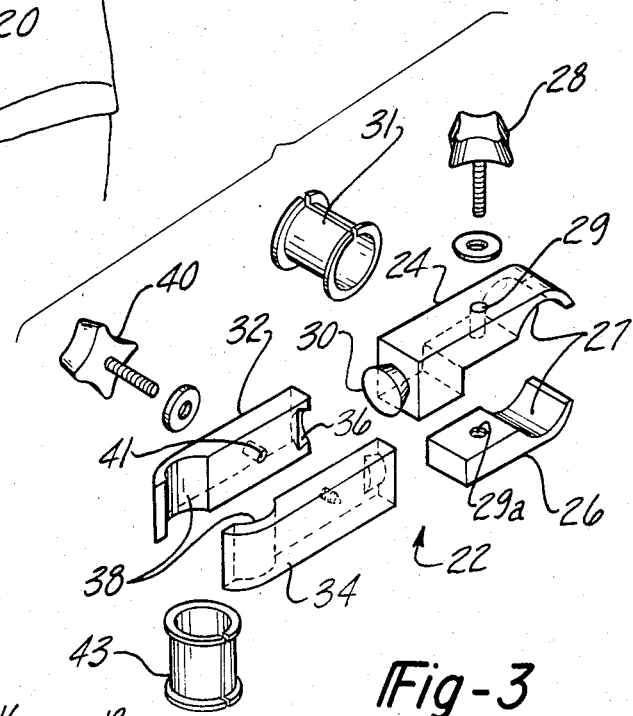
FIG. 3 is a perspective exploded illustration of a portion of the present invention.

With reference to the drawings the self-standing camera support 10 of the present invention is illustrated in FIG. 1 positioned suspended over the shoulders of a person 12 with a camera 14 mounted on the camera support. The camera support 10 of the present invention includes a first generally U-shaped hollow metal tube 16 having opposed, spaced apart first and second ends 18, 20. The central portion or base of the U-shaped first tube 16 is generally straight while the legs are slightly curved from the base toward the ends to generally conform to the upper chest contour of a person who is to wear the support. The tube 16 is described as being hollow metal but it should be appreciated that the tube may be made as an injection molded plastic member.

Mounting means 22 are provided at the central portion of the base of the U-shaped tube 16 for securing the camera to the support. The mounting means 22 provides 360° rotation about each of three perpendicular axes and, in addition, linear adjustment, all as will be more fully described.

The mounting means 22 includes first and second opposed clamp halves 24, 26, each of the clamp halves having a semi-circular recess 27 to accommodate the tube 16. A thumb wheel 28 is threaded through internally threaded apertures 29, 29a in each of the clamp halves to secure the clamp halves together. The clamp halves may be secured together with the tube 16 engaged by the recesses in the clamp halves so that upon loosening the thumb wheel, the clamp halves 24, 26 may be rotated 360° about the longitudinal axis of the straight central portion of the tube 16. This provides 360° rotation with respect to a first axis.

The upper clamp half 24 includes, at the end thereof opposite the recess 27, a generally circular outward projection 30. The projection extends along an axis perpendicular to both the axis of the threaded thumb wheel and the longitudinal axis of the tube 16. A nylon bushing 31 surrounds the tube 16 and fits within recess 27 to facilitate rotation of the clamp halves 24, 26. The bushing may be a replaceable split bushing or a bushing slid onto the tube 16 from one end 18 thereof.

The mounting means 22 includes a second set of clamp halves 32, 34, respectively. Each of these clamp halves 32, 34 includes, at one end, semi-circular recesses 36 which, together, accommodate the circular projection 30. Two semi-circular recesses 38, similar to recesses 27, are provided at the opposite end of the clamp halves 32, 34. A threaded thumb wheel 40 extends through threaded apertures 41, 41a in the clamp halves 32, 34 and upon loosening the thumb wheel the clamp halves 32, 34 may be rotated 360° around the circular projection 30.

A mounting tube 42 is positioned within the recesses 38 of the mounting means 22, with a nylon bushing 43 surrounding the mounting tube 42. If the clamp halves are formed of plastic the bushings 31 and 43 may be eliminated. The camera 14 may be mounted via a suitable, conventional bayonet mounting, to one end of the mounting tube 42. The mounting tube may be adjustable in length and may be rotated within the recesses 38 upon loosening the thumb wheel 40. Thus loosening the first thumb wheel 28 permits rotation of the mounting means through 360° circle relative to the longitudinal axis of the tube 16, and also permits side-to-side or lateral sliding of the mounting means 22 in the direction of the longitudinal axis of the base of the U-shaped tube. Loosening the thumb wheel 40 permits rotation about the circular extension 30 throughout a full 360° circle which is about an axis perpendicular to the axis of the tube 16. Furthermore the mounting tube 42 has a longitudinal axis perpendicular to the aforementioned two axes and the mounting may be rotated a full 360° within the recesses 38 when the thumb wheel 40 is loosened. Thus the mounting means permits 360° rotation about each of three axes.

With the foregoing understanding of the mounting means, reference should now be had to FIGS. 1 and 2 for a further explanation of the component parts of the support 10. The ends 18, 20 of the first tube 16 are telescopically received within a pair of upper shoulder tubes 44, 46. Each of the upper shoulder tubes include external threads 48 at the first end thereof. The ends 18, 20 of the first tube 16 are of slightly reduced diameter, relative to the diameter of the upper shoulder tubes 44, 46, and include an enlarged circumferential rib 50. A nylon bushing or the like 52 surrounds the ends of the tube 16, and a twist lock 54 is provided to secure one end of each of the upper shoulder tubes to its respective end 18, 20, of the first tube 16. The twist locks 54 are externally knurled and internally threaded with an internal rib to engage the bushing 52. The bushing 52 is a split bushing such that upon tightening the twist lock 54 onto the threads 48 the bushing will be compressed thus providing a locking function between the tube end 18 (or 20) and the respective upper shoulder tube 44 (or 46).

Thus it may be appreciated that by loosening the threaded twist lock 54 the degree of insertion of the end 18 (or 20) of the tube 16 into the upper shoulder tube 44 (or 46) may be adjusted. This provides a longitudinal or front-to-back adjustment of the support to accommodate persons of different size.

The upper shoulder tubes 44, 46 have a slight downward curvature and the upper shoulder tubes terminate in downwardly extending open lower ends. Lower shoulder tubes 56, 58, which are essentially straight tubular members, are attached to the open ends of the upper shoulder tubes 44, 46, respectively. Specifically, swivel connection means 60 are provided at the end of each of the upper shoulder tubes for connection to the respective lower shoulder tube. The swivel connection means includes first and second opposed ends 62, 64 which are frictionally engaged by the upper shoulder and lower shoulder tube means and a cam lock 66 which may be disengaged to permit pivotal movement of the lower shoulder tube relative to the upper shoulder tube and thereupon re-engaged to lock the swivel connector in position.

Figure 4:
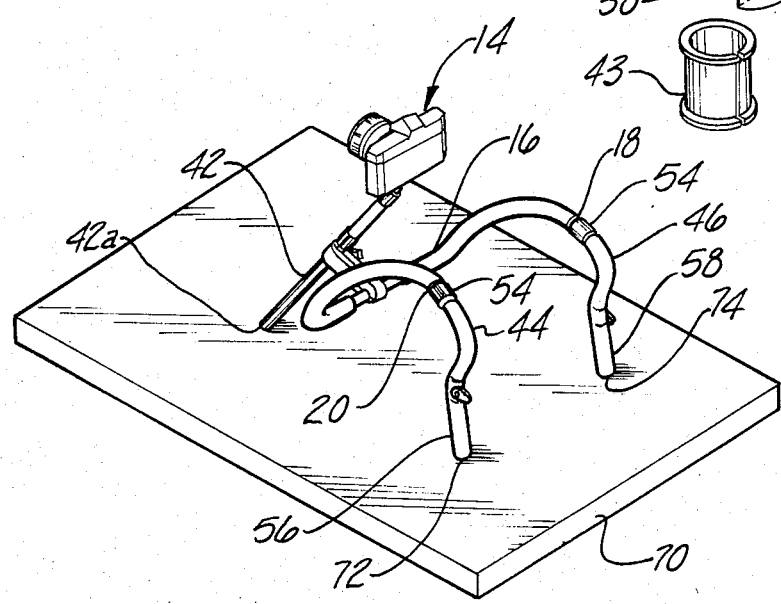
FIG. 4 is an illustration of the support of the present invention positioned on a planar surface such that time exposure photographs may be taken or telephoto lenses used.

Reference should now be had to FIGS. 4 and 5 for a complete understanding of yet another feature of the present invention. In FIG. 4, the support 10 of the present invention is illustrated as positioned on a planar surface 70 and one form of a three point support exists by virtue of contact between the free ends 72, 74 of the lower shoulder means 56, 58, respectively, and the bottom 42a of the mounting tube 42. This provides excellent support especially if a heavy telephoto lens is used with the camera. Obviously the mounting means 22 may be adjusted to provide proper stability and height for the camera. The camera 14 is illustrated in FIG. 4 in a position so that a time exposure photograph of an object may be taken. One of the features of the present invention, therefore, is that the support 10 of the present invention is self-standing and permits a three point contact on a planar surface so that the support may be used other than suspended over the shoulders of a person.

Another feature of the present invention, which may be understood with reference to FIG. 5, is that the camera may be supported in a different form of three-point contact, specifically the ends 72, 74 of the lower shoulder means and the clamp half 26. This form of three point contact heretofore described permits the camera to be rotated and ajusted for close-up photography and, in this regard, FIG. 5 illustrates the position of the camera and support if it was desired to take a close-up photograph of a book 76 resting on the planar surface 70.

The present invention has been described according to a preferred embodiment wherein light weight metal tubular members are utilized with the tubular members adapted to be covered by a cushion type material 78 to avoid abrasion, rubbing or other discomfort by the wearer. That is, each of the tubular members would be covered by the circular cushion material 78 although the swivel connectors 60 and cam lock 66 would, of course, be exposed to provide ready access for adjustments to the support. FIG. 2 illustrates the type of adjustment which is available through the use of the cam lock 66, the adjustment being illustrated by the arrows 80.

The foregoing is a complete description of the preferred embodiment of the present invention. Various changes and modifications may be made without departing from the spirit and scope of the present invention. The invention, therefore, should be limited only by the following claims.

What is claimed is:

1. A camera support or the like comprising:
   a first generally U-shaped tubular member having a base and first and second opposed, spaced apart legs extending therefrom;
   said base having an elongated axis;
   camera mounting means rotatably secured to the base of the first U-shaped tubular member generally intermediate the legs thereof;
   said camera mounting means including a bracket having first and second elongated parts;
   said first elongated part being rotatable through 360° about the elongated axis of the base;
   said second bracket part being rotatable about the elongated axis of said first bracket part through 360°;
   the elongated axis of said first bracket part being perpendicular to the elongated axis of said base; and
   first and second tubular extension means, one end of each of the tubular extension means secured to one of the legs of the first tubular member;
   the free end of each of the tubular extension means together with the mounting means defining three points in a plane for the camera support so that the camera support will be self-standing on said three points for close-up photography or the like.

2. The invention as defined in claim 1 wherein the tubular extension means each include pivot means intermediate the ends thereof and wherein the tubular extension means are longitudinally adjustable about said pivot means toward and away from the camera mounting means.

3. The invention as defined in claim 1 wherein each of said tubular extension means includes first and second tubular members, said first and second tubular members connected for pivoted rotation therebetween.

4. The invention as defined in claim 1 wherein said mounting means includes a mounting tube.

5. The invention as defined in claim 1, wherein said camera mounting means includes an elongating mounting tube onto which the camera is to be mounted;

said mounting tube being rotatable relative to said second bracket part.

* * * * *